US012092749B2

United States Patent
Tao et al.

(10) Patent No.: US 12,092,749 B2
(45) Date of Patent: Sep. 17, 2024

(54) MULTI-STAGE POSITIONING REFERENCE SIGNAL (PRS) MECHANISM FOR DOWNLINK ANGLE OF DEPARTURE (DL-AoD) POSITIONING

(71) Applicant: Nokia Technologies Oy, Espoo (FI)

(72) Inventors: Tao Tao, Shanghai (CN); Ryan Keating, Chicago, IL (US); Mikko Säily, Laukkoski (FI); Karri Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 17/636,061

(22) PCT Filed: Oct. 1, 2019

(86) PCT No.: PCT/CN2019/109789
§ 371 (c)(1),
(2) Date: Feb. 17, 2022

(87) PCT Pub. No.: WO2021/062858
PCT Pub. Date: Apr. 8, 2021

(65) Prior Publication Data
US 2022/0283259 A1    Sep. 8, 2022

(51) Int. Cl.
*G01S 5/00*     (2006.01)
*H04L 5/00*     (2006.01)
*H04W 24/10*    (2009.01)
*H04W 56/00*    (2009.01)

(52) U.S. Cl.
CPC .......... *G01S 5/0036* (2013.01); *H04L 5/0051* (2013.01); *H04W 24/10* (2013.01); *H04W 56/001* (2013.01)

(58) Field of Classification Search
CPC .... G01S 5/0036; G01S 5/0205; G01S 5/0236; H04L 5/0051; H04L 5/0023; H04L 5/005; H04L 5/0053; H04L 5/0094; H04W 24/10; H04W 56/001; H04W 64/006
See application file for complete search history.

(56) References Cited

U.S. PATENT DOCUMENTS

| 2017/0339658 A1 | 11/2017 | Wang et al. |
| 2017/0374637 A1 | 12/2017 | Akkarakaran et al. |
| 2018/0020423 A1 | 1/2018 | Wang et al. |
| 2018/0049154 A1 | 2/2018 | Choi et al. |

(Continued)

FOREIGN PATENT DOCUMENTS

| CN | 102273123 A | 12/2011 |
| CN | 107113569 A | 8/2017 |

(Continued)

OTHER PUBLICATIONS

"Revised SID: Study on NR positioning support", 3GPP TSG RAN Meeting #81, RP-182155, Agenda: Sep. 3, 2018, Intel Corporation, Sep. 10-13, 2018, 6 pages.

(Continued)

*Primary Examiner* — Kabir A Timory
(74) *Attorney, Agent, or Firm* — Tong, Rea, Bentley & Kim, LLC

(57) ABSTRACT

Systems, methods, apparatuses, and computer program products for a multi-stage positioning reference signal (PRS) mechanism for downlink angle of departure (DL-AoD) positioning.

16 Claims, 8 Drawing Sheets

(56) References Cited

U.S. PATENT DOCUMENTS

2021/0072340 A1\* 3/2021 Wang .................... G01S 5/0215
2021/0076225 A1\* 3/2021 Kim ...................... H04W 80/02

FOREIGN PATENT DOCUMENTS

| EP | 3911052 A1 | 11/2021 |
| WO | 2020/219283 A1 | 10/2020 |
| WO | 2021/023056 A1 | 2/2021 |
| WO | 2021/023912 A1 | 2/2021 |

OTHER PUBLICATIONS

"3rd Generation Partnership Project; Technical Specification Group Radio Access Network; Study on NR positioning support (Release 16)", 3GPP TR 38.855, V16.0.0, Mar. 2019, pp. 1-197.

"New WID: NR Positioning Support", 3GPP TSG RAN Meeting #83, RP-190752, Agenda: 9.1.1, Intel Corporation, Mar. 18-21, 2019, 6 pages.

"Physical layer procedure for NR positioning", 3GPP TSG RAN WG1 #97, R1-1906055, Agenda: 7.2.10.4, Huawei, May 13-17, 2019, 14 pages.

International Search Report and Written Opinion received for corresponding Patent Cooperation Treaty Application No. PCT/CN2019/109789, dated Jun. 29, 2020, 10 pages.

Office action received for corresponding Chinese Patent Application No. 201980100292.7, dated Apr. 20, 2023, 7 pages of office action and no page of translation available.

Extended European Search Report received for corresponding European Patent Application No. 19947440.4, dated Jun. 5, 2023, 14 pages.

"Considerations on Phy-layer procedures for NR Positioning", 3GPP TSG RAN WG1 #98, R1-1909502, Agenda: 7.2.10.4, Qualcomm Incorporated, Aug. 26-30, 2019, 6 pages.

"Summary of 7.2.10.4: PHY procedures for positioning measurements", 3GPP TSG-RAN WG1 Meeting #98, R1-1909513, Agenda: 7.2.10.4, Qualcomm Incorporated, Aug. 26-30, 2019, 26 pages.

\* cited by examiner

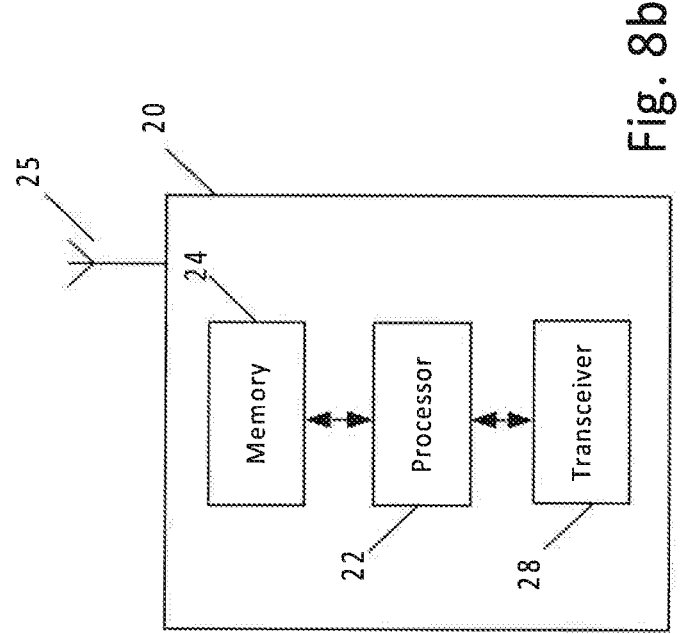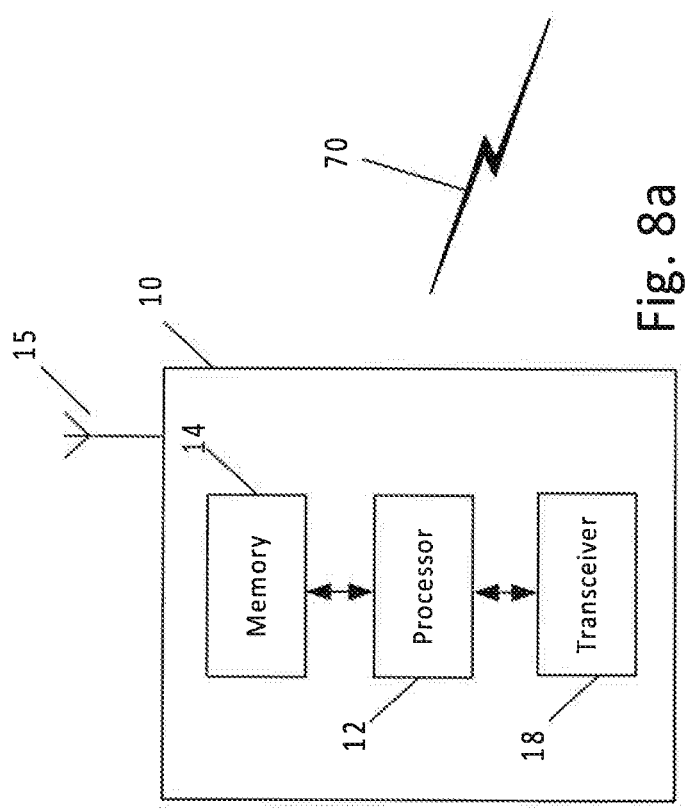

MULTI-STAGE POSITIONING REFERENCE SIGNAL (PRS) MECHANISM FOR DOWNLINK ANGLE OF DEPARTURE (DL-AoD) POSITIONING

RELATED APPLICATION

This application was originally filed as PCT Application No. PCT/CN2019/109789 on Oct. 1, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for a multi-stage positioning reference signal (PRS) mechanism for downlink angle of departure (DL-AoD) positioning in communications systems, such as NR.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include performing, by a user equipment (UE), at least one first measurement of at least one reference signal (RS) according to at least one first configuration. The at least one first configuration may be associated with one or more sets of additional configurations (e.g., the one or more sets of additional configurations may include second configurations alone, the second configurations and third configurations, etc.). The method may include determining, by the UE and based on the at least one first measurement, at least one set of additional configurations of the one or more sets of additional configurations to use for measuring at least one set of positioning reference signals (PRSs). The method may include performing, by the UE, at least one second measurement of the at least one set of positioning reference signals (PRSs) according to the at least one set of additional configurations.

In a variant, the method may further include receiving the at least one first configuration and the one or more sets of additional configurations prior to performing the at least one first measurement. In a variant, the at least one first configuration and the one or more sets of additional configurations may be received using a same configuration message. In a variant, the at least one first configuration may comprise information that identifies at least one first set of time frequency resources for the at least one reference signal (RS), and the at least one set of additional configurations may identify time frequency resources for the at least one set of positioning reference signals (PRSs).

In a variant, the at least one reference signal (RS) may comprise at least one wide-beam reference signal (RS). In a variant, the at least one wide-beam reference signal (RS) may be associated with at least one synchronization signal and physical broadcast channel block (SSB). In a variant, at least one positioning reference signals (PRS) may comprise at least one narrow-beam positioning reference signal (PRS). In a variant, a beam coverage of the at least one narrow-beam positioning reference signal (PRS) may be within a beam coverage of one wide-beam reference signal (RS). In a variant, at least one narrow-beam positioning reference signal (PRS) may be associated with at least one channel state information reference signal (CSI-RS).

In a variant, the method may include receiving information that identifies at least one mapping between the at least one first configuration and the one or more sets of additional configurations prior to performing the at least one first measurement. In a variant, the at least one first measurement may include at least one quality-related measurement of the at least one reference signal (RS). In a variant, the method may include transmitting a first measurement report of the first measurement. In a variant, the method may include transmitting, in association with the first measurement report, at least one indication of one or more preferred reference signals (RSs) of the at least one reference signal (RS) after performing the at least one first measurement. In a variant, the at least one first measurement may further include an angle of arrival (AoA) measurement of the at least one reference signal (RS). In a variant, the method may include performing the at least one second measurement based on the AoA measurement of the at least one reference signal (RS). In a variant, the method may include performing the at least one second measurement of at least one subset of the at least one set of positioning reference signals (PRSs).

In a variant, the method may include transmitting at least one angle of departure (AoD) measurement report after performing the at least one second measurement. In a variant, the method may include transmitting at least one indication of the at least one set of additional configurations after performing the at least one first measurement. In a variant, the method may include determining the at least one set of additional configurations from pre-configured information.

According to a second embodiment, a method may include transmitting, by a network node, at least one reference signal (RS) based on at least one first configuration. The at least one first configuration may be associated with one or more sets of additional configurations for one or more sets of positioning reference signals (PRSs). The method may include transmitting, by the network node, the at least one set of positioning reference signals (PRSs) according to at least one set of additional configurations.

In a variant, the network node may comprise a non-serving cell network node. In a variant, the method may include determining the at least one set of additional configurations for which to transmit the at least one set of positioning reference signals (PRSs) based on the at least one measurement report of the at least one reference signal (RS). In a variant, the at least one first configuration may comprise information that identifies at least one set of first time frequency resources for the at least one reference signal (RS), and the at least one set of additional configurations may identify at least one set of time frequency resources for the at least one set of positioning reference signals (PRSs). In a variant, the at least one reference signal (RS) may comprise at least one wide-beam reference signal (RS).

In a variant, the at least one wide-beam reference signal (RS) may be associated with at least one synchronization signal and physical broadcast channel block (SSB). In a variant, at least one positioning reference signals (PRS) may comprise at least one narrow-beam positioning reference signal (PRS). In a variant, a beam coverage of the at least one narrow-beam positioning reference signal (PRS) may be within a beam coverage of one wide-beam reference signal (RS). In a variant, the at least one narrow-beam positioning reference signal (PRS) may be associated with at least one channel state information reference signal (CSI-RS). In a variant, at least one measurement report associated with the at least one reference signal (PRS) may include at least one quality-related measurement of the at least one reference signal (RS).

In a variant, the at least one measurement report may further includes an angle of arrival (AoA) measurement of the at least one reference signal (RS). In a variant, the method may include receiving a first measurement report of the first measurement. In a variant, the method may include receiving, in association with the first measurement report, at least one indication of one or more preferred reference signals (RSs) of the at least one reference signal (RS). In a variant, the method may include receiving at least one angle of departure (AoD) measurement report. In a variant, the method may include receiving at least one indication of the at least one set of additional configurations.

According to a third embodiment, a method may include transmitting, by a serving cell network node, at least one first configuration for at least one reference signal (RS). According to an embodiment, the method may include transmitting, by the serving cell network node, one or more sets of additional configurations for one or more sets of positioning reference signals (PRSs). The one or more sets of additional configurations may be associated with the at least one first configuration. The at least one first configuration and the one or more sets of additional configurations may be transmitted using a same configuration message.

In a variant, the network node may comprise at least one of a base station (BS) or a location management function (LMF). In a variant, the at least one first configuration may identify at least one set of first time frequency resources associated with the at least one reference signal (RS). In a variant, the one or more sets of additional configurations may identify one or more sets of second time frequency resources associated with one or more sets of positioning reference signals (PRSs). In a variant, the method may include receiving at least one indication of at least one preferred positioning reference signal (PRS) after transmitting the at least one first configuration and the one or more sets of additional configurations. In a variant, the method may include transmitting the at least one indication to at least one non-serving cell network node after receiving the at least one indication. In a variant, the method may include receiving at least one measurement report related to at least one measurement of the at least one first positioning reference signal or the one or more sets of second positioning reference signals.

A third embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fourth embodiment may be directed to an apparatus that may include circuitry configured to perform the method according to the first embodiment, the second embodiment, or the third embodiment, or any of the variants discussed above.

A fifth embodiment may be directed to an apparatus that may include means for performing the method according to the first embodiment, the second embodiment, or the third embodiment, or any of the variants discussed above.

A sixth embodiment may be directed to a computer readable medium comprising program instructions stored thereon for performing at least the method according to the first embodiment, the second embodiment, or the third embodiment, or any of the variants discussed above.

A seventh embodiment may be directed to a computer program product encoding instructions for performing at least the method according to the first embodiment, the second embodiment, or the third embodiment, or any of the variants discussed above.

BRIEF DESCRIPTION OF THE DRAWINGS

For proper understanding of example embodiments, reference should be made to the accompanying drawings, wherein:

FIG. 8a illustrates an example block diagram of an apparatus, according to an embodiment; and FIG. 8b illustrates an example block diagram of an apparatus, according to another embodiment.

DETAILED DESCRIPTION

Figure 1:
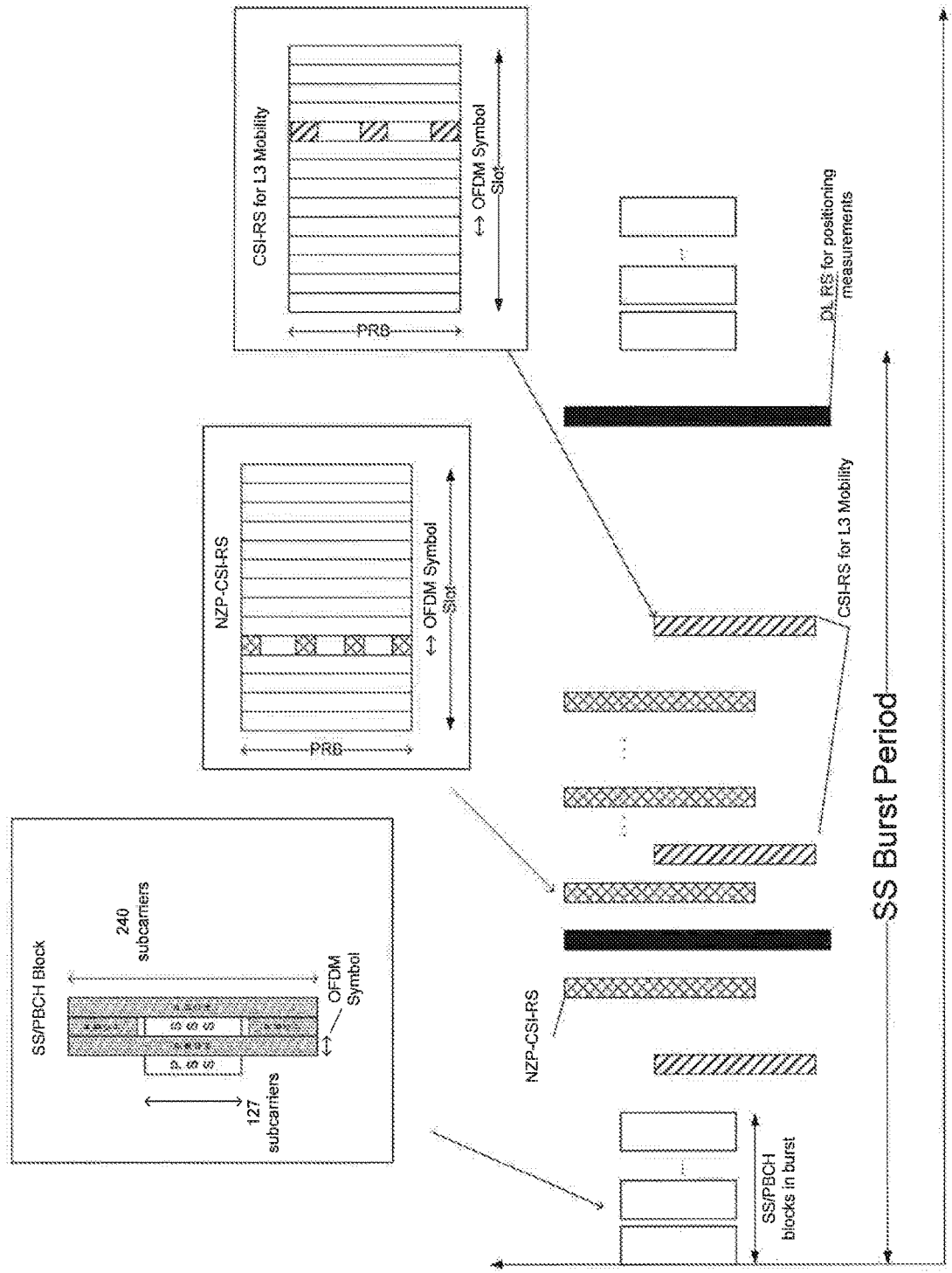
FIG. 1 illustrates an example of a time-frequency mapping of downlink reference signals, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for a multi-stage positioning reference signal (PRS) mechanism for downlink angle of departure (DL-AoD) positioning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In NR, the DL-AoD positioning may operate as follows for a network node and a user equipment (UE): The network node may transmit a reference signal (RS) with beam sweeping, the UE may measure (some or all) beams and may report a reference signal received power (RSRP) of each measured beam to the network node. Then the network node may estimate the AoD based on the UE's RSRP report. For the UE, the previously described operations may be executed for multiple network nodes. Then a location server may calculate the UE position by AoDs reported from the network node.

Some previously proposed techniques related to RS for DL-AoD have proposed using legacy synchronization signal and physical broadcast channel block (SSB) as a candidate RS to support DL-AoD. More specifically, DL-AoD could be based on synchronization signal RSRP (SS-RSRP) (i.e., SS-RSRP could be used to report DL-AoD positioning). The issue of only using SSB as a positioning RS for DL-AoD relates to the positioning accuracy, as NR only supports 8 SSBs in frequency range 1 (FR1), and 64 SSBs in frequency range two (FR2). For example, the SSBs may be transmitted periodically in a sequential pattern covering multiple directions (i.e., in a sweeping pattern). Each of the SSBs may represent different areas or directions of a sector covered by a serving cell. For example, a network node with a 3 meter (m) height and a 120 degree (120°) sector can be covered with 64 SSBs. Each SSB may have, in this example, a radiation beam width of 11.2° (using 8 elements) in elevation and 15° (using 8 elements) in azimuth. Based on such radiation, the DL-AoD method may have very low positioning accuracy.

One potential enhancement may be to use narrow beam PRS (e.g., CSI-RS) to increase resolution. However, sweeping narrow beam PRS to all directions may not only increase the transmission and resource overhead at the network node but may also increase the measurement and reporting overhead at the UE. One proposed solution uses beam refinement (i.e., from SSB to channel state information reference signal (CSI-RS)) to increase hearability of a PRS. This solution may reduce the PRS transmission and measurement overhead, at least for a serving cell, but, it may create a system bottleneck in the beam refinement procedure for a non-serving cell. Specifically, in NR, a UE may not be able to measure the CSI-RS without a configuration from the network. As there is no direct communication link between the UE and a non-serving cell, any information related to beam refinement would need to be forwarded via, e.g., a location server. This may result in huge signalling overhead and large latency for positioning.

In another previously proposed solution, the ability to configure a UE with quasi-co-location information to assist it in measuring the PRS is addressed. This solution may allow the UE to determine which neighbour cell beams to measure. However, the network may still have to configure the UE to measure those beams which are quasi-co-located with the narrow beam PRS. There is also a risk that a given UE may not have the needed quasi-co-location information necessary for all neighboring cells. Additionally, the UE may still have to measure a large amount of beams to determine this information. Thus, solutions that use quasi-co-location information suffer from significant problems.

Based at least on the foregoing, it is clear that there has been a need for a mechanism to increase the positioning accuracy of DL-AoD, but with low overhead, without a need for the UE to have information related to neighboring non-serving cells, and/or without having to measure large numbers of beams.

Some embodiments described herein may provide for a multi-stage PRS mechanism for DL-AoD positioning. For instance, some embodiments may include configuring two types of PRSs that are associated with each other. Based on the measurement of the first PRS, the UE may determine, without additional information from a network node, one or more RSs on which to perform measurements in a second stage. By doing this, a precision of positioning accuracy can be achieved and system overhead (including signaling overhead, measurement and report overhead, and PRS transmission overhead) can be reduced. Thus, some embodiments described herein allow for detection and/or measurement of a neighbour cell CSI-RS at a UE without explicit feedback or beam management.

FIG. 1 illustrates an example of a time-frequency mapping of downlink reference signals, according to some embodiments. FIG. 1 illustrates an example of SS/PBCH or SSB, CSI-RS (NZP-CSI-RS) for beam management, L3 Mobility CSI-RS signals in a time-frequency grid. CSI-RS for L3 mobility may be used for performing L3/RRC/Cell mobility measurements where as NZP-CSI-RS may be used for serving cell beam management. SSB measurements may be used for beam management purposes (e.g., L1-RSRP) or for L3 mobility purposes. Downlink reference signals may be used for positioning measurement (e.g., PRSs). As described above, FIG. 1 is provided as an example. Other examples are possible, according to some embodiments.

Figure 2:
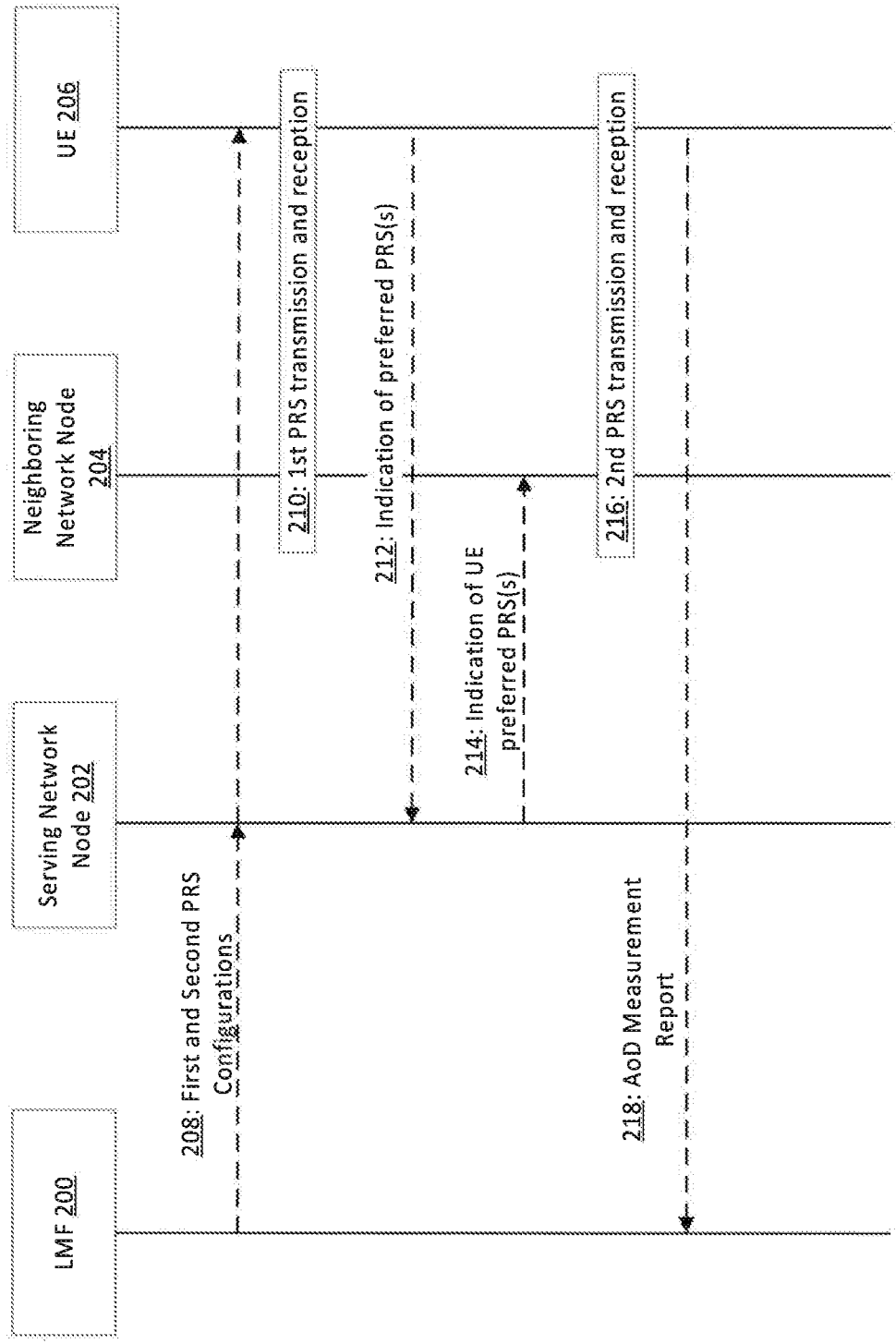
FIG. 2 illustrates an example signaling diagram of a procedure, according to some embodiments.

FIG. 2 illustrates an example signaling diagram of a procedure, according to some embodiments. FIG. 2 shows an LMF 200 (e.g., a network node that may support location determination for a UE and/or that obtains uplink/downlink location measurements), a serving network node 202 (e.g., a network node in a serving cell), a neighboring network node 204 (e.g., a network node in a non-serving cell), and a UE 206.

As shown at 208, the LMF 200 may provide, to the serving network node 202, first and second PRS configurations and the serving network node 202 may provide the first and second configurations to the UE 206. Additionally, or alternatively, the first and second PRS configurations may be transmitted by a location server (e.g., via LTE positioning protocol (LPP)). A first configuration may identify a set of time frequency resources for a first PRS, described below, and a second configuration may identify time frequency resources for a second PRS. A PRS may include an RS that is used for positioning purposes. In some embodiments, the first PRS or the second PRS may be an RS that is used for non-positioning purposes.

In addition, in some embodiments, the LMF 200 may provide information that identifies a mapping between the first and second configurations and/or between first PRSs and second PRSs corresponding to the first and second configurations. For example, a first configuration may be associated with a set of second configurations, and a first PRS may be associated with a set of second PRSs (e.g., a first PRS may be associated with a set of second PRSs that geographically overlap with the first PRS). Example associations, according to some embodiments, are illustrated in, and described with respect to, FIG. 3. The LMF 200 may provide information that identifies this mapping to the UE 206 via the serving network node 202.

In some embodiments, the set of time frequency resources identified by a second configuration may not specify the exact set of PRSs that is to use those resources, but rather may reserve them for whichever set may be transmitted (the decision about which set(s) of second PRSs to transmit is described below). In some embodiments, the LMF 200 may transit the first and second configurations to the serving network node 202 using a same configuration message and/or the serving network node 202 may transmit the first and second configurations to the UE 206 using the same configuration message.

As shown at 210, the neighboring network node 204 may transmit, and the UE 206 may receive, a first PRS. For example, the network node 204 may transmit, and the UE 206 may receive, the first PRS according to a first configuration associated with the first PRS (e.g., using the time frequency resources configured by the first configuration). In some embodiments, a first PRS may be a wide-beam PRS (e.g., with wider beam width or larger coverage than the second PRS(s) that may be transmitted, as described below). For example, the first PRS may be associated with a synchronization signal and physical broadcast channel block (SSB). In some embodiments, the neighboring network node 204 may transmit, and the UE 206 may receive, multiple first PRSs. In some embodiments, the neighboring network node 204 may transmit the multiple PRSs using beam sweeping operations to transmit the multiple PRSs in multiple directions.

In some embodiments, in association with receiving the first PRS, the UE 206 may perform a first measurement of the first PRS. For example, the UE 206 may perform a quality-related measurement of the first PRS, such as an RSRP measurement. In some embodiments, performing the first measurement may include performing an angle of arrival (AoA) measurement of the first PRS. If the UE 206 is orientation aware, then the UE 206 may perform an AoA measurement using a predefined coordinate system common to the UE 206 and the network. Alternatively, if the UE 206 is not orientation aware, then the UE 206 may perform a AoA measurement using a coordinate system fixed to the UE 206 (and rotating relative to the predefined coordinate system when the UE 206 is rotating) using multiple first PRSs from either the same neighboring network node 204 or from different neighboring network nodes 204.

In some embodiments, the UE 206 may determine a set of second PRSs, associated with the first PRS, for which to perform a set of second measurements based on the first measurement. For example, the UE 206 may determine to measure a set of second PRSs associated with the first PRS that has a highest RSRP relative to one or more other first PRSs that the UE 206 received. The UE 206 may identify the set of second PRSs based on the mapping information received from the serving network node 202.

Additionally, or alternatively, the UE 206 may determine a set of second configurations according to which to perform the set of second measurements. For example, the UE 206 may determine a set of second time frequency resources on which to perform the set of second measurements.

As shown at 212, the UE 206 may transmit, and the serving network node 202 may receive, an indication of one or more preferred first PRSs and/or preferred second PRSs. For example, the indication may identify a preferred first PRS that has a highest relative RSRP to one or more other PRSs, may identify a set of second PRSs associated with the first PRS that has the highest relative RSRP, and/or the like.

As shown at 214, the serving network node 202 may transmit, and the neighboring network node 204 may receive, the indication of the UE 206's one or more preferred first and/or second PRSs. For example, the serving network node 202 may transmit, and the neighboring network node 204 may receive, the indication via an X2 interface between the serving network node 202 and the neighboring network node 204. In some embodiments, the UE 206 and/or the neighboring network node 204 may transmit, and the LMF 200 may receive, the indication of the preferred PRS(s). In this case, rather than the neighboring network node 204 transmitting the indication to the neighboring network node 204, the LMF 200 may transmit the indication to the neighboring network node 204 (e.g., via LTE positioning protocol (LPP), NR positioning protocol A (NRPPa), and/or the like).

After receiving the indication, the neighboring network node 204 may determine a set of second PRSs to transmit based on the preferred first PRS (e.g., a set of second PRSs that is associated with the first PRS). In some embodiments, this determination may be performed without further signaling or communication between the network entities illustrated in FIG. 2, which may reduce signaling overhead, conserve network bandwidth, reduce latency, and/or the like. For example, the set of second PRSs may be determined from a preconfigured mapping between one or more first PRSs and one or more sets of second PRSs associated with each of the one or more first PRSs.

As shown at 216, the neighboring network node 204 may transmit, and the UE 206 may receive, a set of second PRSs. For example, the neighboring network node 204 may transmit, and the UE 206 may receive, the set of second PRSs according to a set of second configurations associated with the set of second PRSs (e.g., using the time frequency resources configured by the set of second configurations). In some embodiments, a second PRS may be a narrow-beam PRS (e.g., narrower than a first PRS(s) that was transmitted). For example, the second PRS may be associated with a channel state information reference signal (CSI-RS). In some embodiments, the neighboring network node 204 may transmit, and the UE 206 may receive, multiple second PRSs. In some embodiments, the neighboring network node 204 may transmit the multiple second PRSs using beam sweeping operations to transmit the multiple second PRSs in multiple directions.

In association with receiving the set of second PRSs, the UE 206 may perform a second measurement of the set of second PRSs. For example, the UE 206 may perform one or more quality-related measurements of each of the set of second PRSs. By performing second measurements of only the second PRSs that correspond to the preferred first PRS, measurement and/or reporting overhead may be reduced. In some embodiments, the UE 206 may perform a second measurement of a subset of the set of second PRSs. For example, the UE 206 may perform the second measurement based on an AoA measurement performed above with respect to the first PRS. This may further reduce measurement and/or reporting overhead between the nodes illustrated in FIG. 2. An example of this, according to some embodiments, is illustrated in, and described with respect to, FIG. 4.

After performing the second measurement, the UE 206 may transmit, and the LMF 200 may receive, one or more measurement reports (e.g., some of which may be communicated via the serving network node 202). For example, as illustrated in FIG. 2, at 218, the UE 206 may transmit an angle of departure (AoD) measurement report.

As indicated above, FIG. 2 is provided as an example. Other examples are possible, according to some embodiments.

Figure 3:
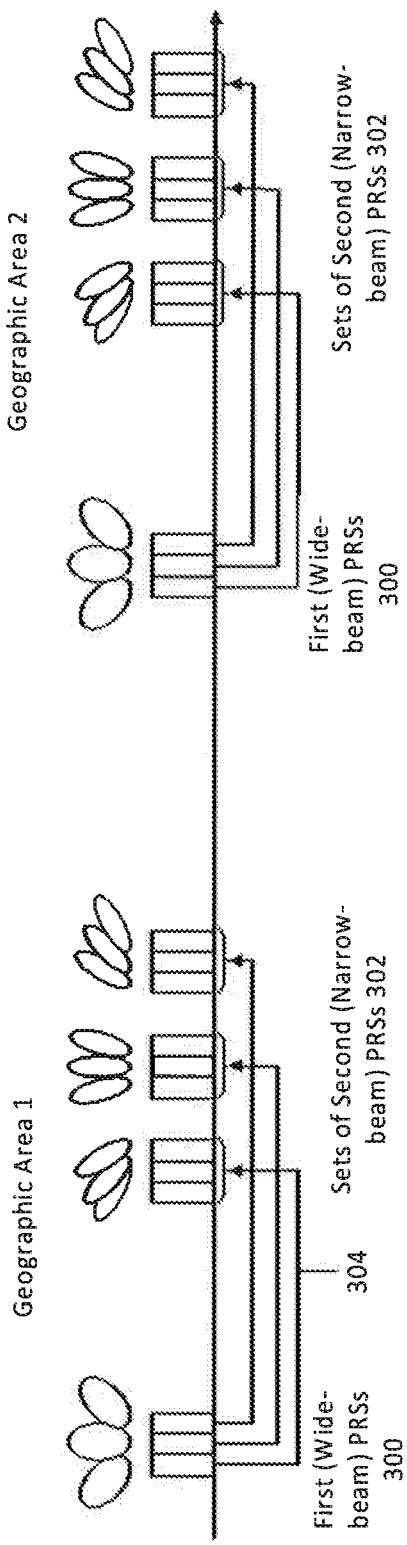
FIG. 3 illustrates an example association between wide-beam PRS and narrow-beam PRS, according to some embodiments.

FIG. 3 illustrates an example association between wide-beam PRS and narrow-beam PRS, according to some embodiments. FIG. 3 illustrates first PRSs and second PRSs associated with two different geographical areas (geographic area 1 and geographic area 2). As further illustrated, each of the two geographical areas is associated with a set of first (wide-beam) PRSs 300. In addition, as further illustrated in FIG. 3, each of the geographical areas may be associated with multiple sets of second (narrow-beam) PRSs 302. As illustrated at 304, for example, a first PRS 300 may be associated with a set of second PRSs 302. In other words, each of the first PRSs 300 may be associated with one or more second PRSs 302, depending on a quantity of second PRSs included in the corresponding set of second PRSs 302.

As described above, FIG. 3 is provided as an example. Other examples are possible, according to some embodiments.

Figure 4:
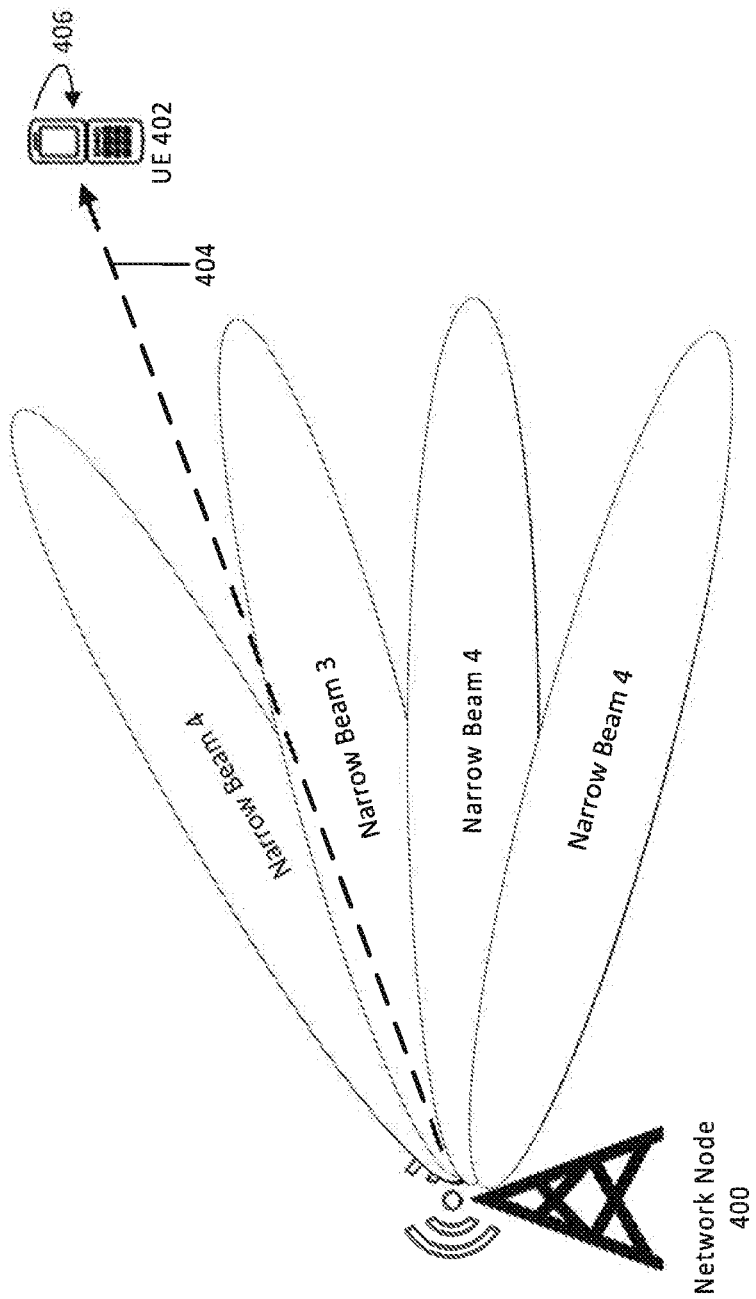
FIG. 4 illustrates an example partial set narrow-beam PRS measurement based on angle of arrival (AoA), according to some embodiments.

FIG. 4 illustrates an example partial set narrow-beam PRS measurement based on angle of arrival (AoA), according to some embodiments. FIG. 4 illustrates a network node 400 (e.g., a neighboring network node 204) and a UE 402 (e.g., UE 206). As shown at 404, the UE 402 may perform an AoA measurement in a manner similar to that described elsewhere herein (e.g., an estimated AoA of a first PRS). As shown at 406, the UE 402 may select second PRSs based on the AoA measurement. For example, the UE 402 may select narrow beams 3 and 4 (e.g., which may be narrow-beam PRSs, similar to that described elsewhere herein) based on the AoA measurement. The network node 400 may then transmit narrow beams 3 and 4, in a manner similar to that described elsewhere herein.

As described above, FIG. 4 is provided as an example. Other examples are possible, according to some embodiments.

Figure 5:
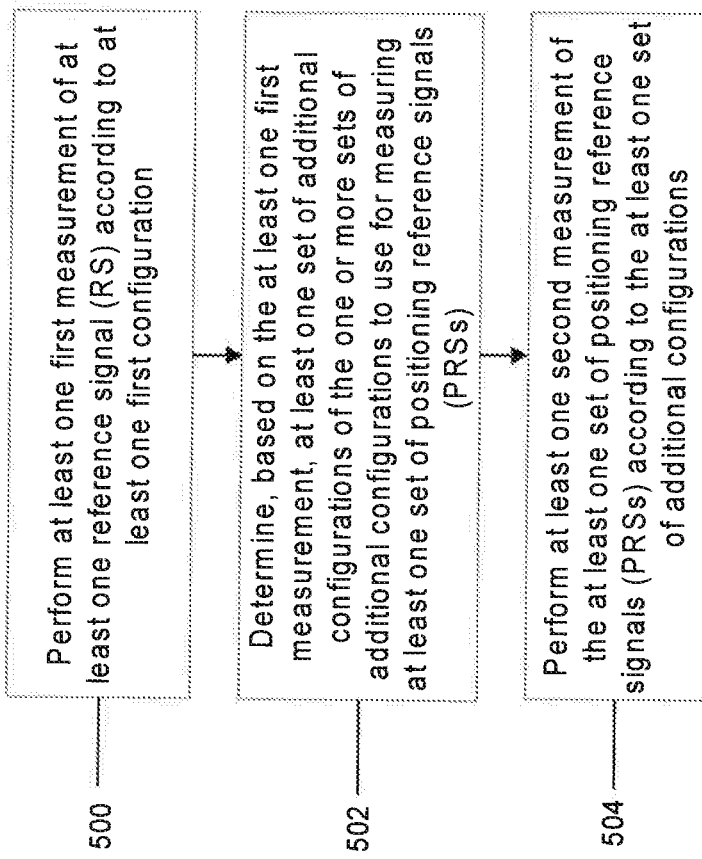
FIG. 5 illustrates an example flow diagram of a method, according to some embodiments.

FIG. 5 illustrates an example flow diagram of a method, according to some embodiments described herein. For example, FIG. 5 illustrates example operations of a UE (e.g., similar to apparatus 20 in FIG. 8b). Some of the operations shown in FIG. 5 may be similar to some operations shown in FIGS. 1-4.

In an embodiment, the method may include, at 500, performing at least one first measurement of at least one reference signal (RS) according to at least one first configuration. The at least one first configuration may be associated with one or more sets of additional configurations. In an embodiment, the method may include, at 502, determining, based on the at least one first measurement, at least one set of additional configurations of the one or more sets of additional configurations to use for measuring at least one set of positioning reference signals (PRSs). For example, the determining 502 may be performed after performing the at least one first measurement at 500. In an embodiment, the method may include, at 504, performing at least one second measurement of the at least one set of positioning reference signals (PRSs) according to the at least one set of additional configurations. For example, the performing 504 of the at least one second measurement may be performed after the determining at 502.

In some embodiments, the at least one RS may be at least one RS used for positioning purposes (e.g., at least one PRS), or may be at least one RS used for non-positioning purposes. In some embodiments, the method may include receiving the at least one first configuration and the one or more sets of additional configurations prior to performing the at least one first measurement. In some embodiments, the at least one first configuration and the one or more sets of additional configurations may be received using a same configuration message. In some embodiments, the at least one first configuration may comprise information that identifies at least one first set of time frequency resources for the at least one reference signal (RS), and the at least one set of additional configurations may identify time frequency resources for the at least one set of positioning reference signals (PRSs).

In some embodiments, the at least one reference signal (RS) may comprise at least one wide-beam reference signal (RS). In some embodiments, the at least one wide-beam reference signal (RS) may be associated with at least one synchronization signal and physical broadcast channel block (SSB). In some embodiments, at least one positioning reference signals (PRS) may comprise at least one narrow-beam positioning reference signal (PRS). In some embodiments, a beam coverage of the at least one narrow-beam positioning reference signal (PRS) may be within a beam coverage of one wide-beam reference signal (RS). In some embodiments, the at least one narrow-beam positioning reference signal (PRS) may be associated with at least one channel state information reference signal (CSI-RS).

In some embodiments, the method may include receiving information that identifies at least one mapping between the at least one first configuration and the one or more sets of additional configurations prior to performing the at least one first measurement. In some embodiments, the at least one first measurement may include at least one quality-related measurement of the at least one reference signal (RS). In some embodiments, the at least one first measurement may further includes an angle of arrival (AoA) measurement of the at least one reference signal (RS). In some embodiments, the method may include transmitting a first measurement report of the first measurement. In some embodiments, the method may include transmitting, in association with the first measurement report, at least one indication of one or more preferred reference signals (RSs) of the at least one reference signal (RS) after performing the at least one first measurement. In some embodiments, performing the at least one second measurement may comprise performing the at least one second measurement based on the AoA measurement of the at least one reference signal (RS). In some embodiments, performing the at least one second measurement may comprise performing the at least one second measurement of at least one subset of the at least one set of positioning reference signals (PRSs).

In some embodiments, the method may further include transmitting at least one angle of departure (AoD) measurement report after performing the at least one second measurement. In some embodiments, the method may further include transmitting at least one indication of the at least one set of additional configurations after performing the at least one first measurement. In some embodiments, determining the at least one set of additional configurations may comprise determining the at least one set of additional configurations from pre-configured information.

As described above, FIG. 5 is provided as an example. Other examples are possible according to some embodiments.

Figure 6:
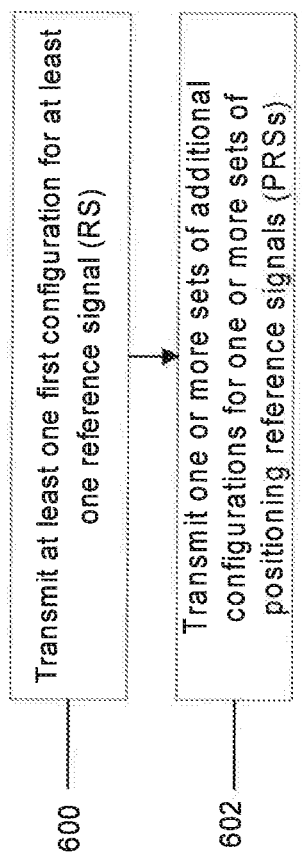
FIG. 6 illustrates an example flow diagram of a method, according to some embodiments.

FIG. 6 illustrates an example flow diagram of a method, according to some embodiments described herein. For example, FIG. 6 shows example operations of a network node (e.g., similar to, or of, apparatus 10 of FIG. 8a). Some of the operations illustrated in FIG. 6 may be similar to some operations shown in FIGS. 1-4.

In an embodiment, the method may include, at 600, transmitting at least one first configuration for at least one reference signal (RS). In an embodiment, the method may include, at 602, transmitting one or more sets of additional configurations for one or more sets of positioning reference signals (PRSs). The one or more sets of additional configurations may be associated with the at least one first configuration. The at least one first configuration and the one or more sets of additional configurations may be transmitted using a same configuration message.

In some embodiments, the network node may comprise at least one of a base station (BS) or a location management function (LMF). In some embodiments, the at least one first configuration may identify at least one set of first time frequency resources associated with the at least one reference signal (RS), and the one or more sets of additional configurations may identify one or more sets of second time frequency resources associated with one or more sets of positioning reference signals (PRSs).

In some embodiments, the at least one RS may be at least one RS used for positioning purposes (e.g., at least one PRS), or may be at least one RS used for non-positioning purposes. In some embodiments, the method may include receiving at least one indication of at least one preferred positioning reference signal (PRS) after transmitting the at least one first configuration and the one or more sets of additional configurations. In some embodiments, the method may include transmitting the at least one indication to at least one non-serving cell network node after receiving the at least one indication. In some embodiments, the method may include receiving at least one measurement report related to at least one measurement of the at least one first positioning reference signal or the one or more sets of second positioning reference signals.

As described above, FIG. 6 is provided as an example. Other examples are possible, according to some embodiments.

Figure 7:
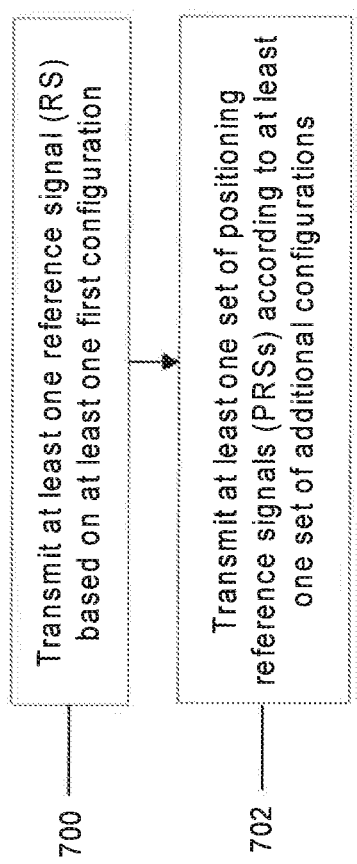
FIG. 7 illustrates an example flow diagram of a method, according to some embodiments.

FIG. 7 illustrates an example flow diagram of a method, according to some embodiments described herein. For example, FIG. 7 shows example operations of a network node (e.g., similar to, or of, apparatus 10 of FIG. 8a). Some of the operations illustrated in FIG. 7 may be similar to some operations shown in FIGS. 1-4.

In an embodiment, the method may include, at 700, transmitting at least one reference signal (RS) based on at least one first configuration. The at least one first configuration may be associated with one or more sets of additional configurations for one or more sets of positioning reference signals (PRSs). In an embodiment, the method may include, at 702, transmitting at least one set of positioning reference signals (PRSs) according to at least one set of additional configurations.

In some embodiments, the at least one RS may be at least one RS used for positioning purposes (e.g., at least one PRS), or may be at least one RS used for non-positioning purposes. In some embodiments, the network node may comprise a non-serving cell network node. In some embodiments, the method may further include determining the at least one set of additional configurations for which to transmit the at least one set of positioning reference signals (PRSs) based on at least one measurement report of the at least one reference signal (RS). In some embodiments, the at least one first configuration may comprise information that identifies at least one set of first time frequency resources for the at least one reference signal (RS), and the at least one set of additional configurations identifies at least one set of time frequency resources for the at least one set of positioning reference signals (PRSs). In some embodiments, the at least one reference signal (RS) may comprise at least one wide-beam reference signal (RS). In some embodiments, the at least one wide-beam reference signal (RS) may be associated with at least one synchronization signal and physical broadcast channel block (SSB). In some embodiments, at least one second positioning reference signals (PRS) may comprises at least one narrow-beam positioning reference signal (PRS). In some embodiments, a beam coverage of the at least one narrow-beam positioning reference signal (PRS) may be within a beam coverage of one wide-beam reference signal (RS). In some embodiments, the at least one narrow-beam positioning reference signal (PRS) may be associated with at least one channel state information reference signal (CSI-RS).

In some embodiments, at least one measurement report associated with the reference signal (RS) may include at least one quality-related measurement of the at least one reference signal (RS). In some embodiments, the at least one measurement may further include an angle of arrival (AoA) measurement of the at least one reference signal (RS). In some embodiments, the method may further include receiving a first measurement report of the first measurement. In some embodiments, the method may further include receiving, in association with the first measurement report, at least one indication of one or more preferred reference signals (RSs) of the at least one reference signal (RS). In some embodiments, the method may include receiving at least one angle of departure (AoD) measurement report. In some embodiments, the method may include receiving at least one indication of the at least one set of additional configurations.

As described above, FIG. 7 is provided as an example. Other examples are possible according to some embodiments.

FIG. 8a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G. In another embodiment, apparatus 10 may be or may be included in a location server, such as a LMF in NR. Additionally, or alternatively, apparatus 10 may be the LMF 200, the serving network node 202, the neighboring network node 204, and/or the network node 400, illustrated in, or described with respect to, FIGS. 1-7.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like and may include an LMC. In another embodiment, apparatus 10 may be a location server, such as an LMF.

According to certain embodiments, apparatus 10 may be controlled by memory 14 and processor 12 to perform the functions associated with any of the embodiments described herein, such as some operations of FIGS. 1-7.

For instance, in one embodiment, apparatus 10 may be controlled by memory 14 and processor 12 to transmit at least one reference signal (RS) based on at least one first configuration. The at least one first configuration may be associated with one or more sets of additional configurations for one or more sets of positioning reference signals (PRSs). In an embodiment, apparatus 10 may be controlled by memory 14 and processor 12 to transmit at least one set of positioning reference signals (PRSs) according to at least one set of additional configurations.

In another embodiment, apparatus 10 may be controlled by memory 14 and processor 12 to transmit at least one first configuration for at least one reference signal (RS). In an embodiment, apparatus 10 may be controlled by memory 14 and processor 12 to transmit one or more sets of additional configurations for one or more sets of positioning reference signals (PRSs). The one or more sets of additional configurations may be associated with the at least one first configuration. The at least one first configuration and the one or more sets of additional configurations may be transmitted using a same configuration message.

FIG. 8*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like. For example, apparatus 20 may include UE 206 and/or UE 402 described with respect to FIGS. 1-7.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8*b*.

As illustrated in the example of FIG. 8*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in, or described with respect to, any of FIGS. 1-7.

For instance, apparatus 20 may be controlled by memory 24 and processor 22 to perform at least one first measurement of at least one reference signal (RS) according to at least one first configuration. The at least one first configuration may be associated with one or more sets of additional configurations. In an embodiment, apparatus 20 may be controlled by memory 24 and processor 22 to determine, based on the at least one first measurement, at least one set of additional configurations of the one or more sets of additional configurations to use for measuring at least one set of positioning reference signals (PRSs). In an embodiment, apparatus 20 may be controlled by memory 24 and processor 22 to perform at least one second measurement of the at least one set of positioning reference signals (PRSs) according to the at least one set of additional configurations.

Therefore, certain example embodiments provide several technological improvements, enhancements, and/or advantages over existing technological processes. For example, one benefit of some example embodiments is a reduction in overhead network signaling, thereby conserving computing and/or processing resources of the network nodes. In addition, the reduction in overhead may reduce latency associated with beam selection and/or may conserve network resources, such as bandwidth. Accordingly, the use of some example embodiments results in improved functioning of communications networks and their nodes and, therefore constitute an improvement at least to the technological field of wireless control and management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa. Example embodiments described with respect to second configurations apply equally to implementations that include additional configurations, and vice versa. For example, an embodiment that is described as including a first configuration associated with at least one set of second configurations equally applies to the first configuration being associated with at least one set of additional configurations (e.g., that includes at least one set of second configurations and at least one set of third configurations).

In addition, although some embodiments are described in the context of a first PRS and a second PRS (where the first PRS and the second PRS are RSs used for positioning purposes), certain embodiments may include one or more RSs that are used for non-positioning purposes. For example, at 210, an RS, not used for positioning purposes, may be transmitted rather than a first PRS, and at 216 a PRS may be transmitted, as described.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. For example, the embodiments described herein are not limited to inter-cell cases. The method of dual-level threshold can be used to indicate a feasible DL RS from a positioning perspective for a serving cell. In addition, some embodiments described herein can provide for requesting PRS on a particular beam when positioning is active.

Partial Glossary

AoA Angle of Arrival
AoD Angle of Departure
CSI-RS Channel State Information Reference Signal
DL Downlink
FR Frequency Range
LCS Location Services
LMF Location Measurement Function
LPP LTE Positioning Protocol
NRPPa NR Positioning Protocol A
NR New Radio
OTDOA Observed Time Difference of Arrival
PRS Positioning Reference Signal
RSRP Reference Signal Received Power
SI Study Item
SS Synchronization Signal
SSB Synchronization Signal Block
TOA Time of Arrival
UE User Equipment
UL Uplink

What is claimed is:

1. A user equipment for supporting a positioning reference signal (PRS) mechanism for downlink angle of departure (DL-AoD) positioning, comprising:
   at least one processor; and
   at least one memory including instructions which, when executed by the at least one processor, cause the user equipment at least to:
      receive a configuration message including at least one first configuration and one or more sets of additional configurations, wherein the at least one first configuration comprises information that identifies at least one first set of time frequency resources for at least one reference signal (RS), and the one or more sets of additional configurations identifies time frequency resources for at least one set of positioning reference signals (PRSs);
      perform at least one first measurement of at least one reference signal for beam measurements according to the at least one first configuration, wherein the at least one reference signal comprises at least one wide-beam reference signal;
         wherein the at least one first configuration is associated with one or more sets of additional configurations for beam measurements;
         wherein the at least one set of positioning reference signals comprises at least one narrow-beam positioning reference signal;
      perform based on the at least one first measurement at least one second measurement of at least one set of positioning reference signals according to at least one set of additional configurations of the one or more sets of additional configurations; and
      transmit at least one angle of departure (AoD) measurement report after performing the at least one second measurement.

2. The user equipment of claim 1, wherein the instructions, when executed by the at least one processor, cause the user equipment at least to:
   receive the at least one first configuration and the one or more sets of additional configurations prior to performing the at least one first measurement.

3. The user equipment of claim 2, wherein the at least one first configuration and the one or more sets of additional configurations are received in a same configuration message.

4. The user equipment of claim 1, wherein the at least one wide-beam reference signal is associated with at least one synchronization signal and physical broadcast channel block.

5. The user equipment of claim 1, wherein a beam coverage of the at least one narrow-beam positioning reference signal is within a beam coverage of one wide-beam reference signal.

6. The user equipment of claim 5, wherein the at least one narrow-beam positioning reference signal is associated with at least one channel state information reference signal.

7. The user equipment of claim 1, wherein the instructions, when executed by the at least one processor, cause the user equipment at least to:
   receive information that identifies at least one mapping between the at least one first configuration and the one or more sets of additional configurations prior to performing the at least one first measurement.

8. The user equipment of claim 1, wherein the at least one first measurement includes at least one quality-related measurement of the at least one reference signal.

9. The user equipment of claim 8, wherein the at least one first measurement further includes an angle of arrival measurement of the at least one reference signal.

10. The user equipment of claim 8, wherein the instructions, when executed by the at least one processor, cause the user equipment at least to:
    transmit a first measurement report of the first measurement; and
    transmit, in association with the first measurement report, at least one indication of one or more preferred reference signals of the at least one reference signal.

11. The user equipment of claim 1, wherein the instructions, when executed by the at least one processor, cause the user equipment at least to:
perform the at least one second measurement based on an angle of arrival measurement of the at least one reference signal.

12. The user equipment of claim 11, wherein the at least one second measurement comprises a measurement of at least one subset of the at least one set of positioning reference signals.

13. The user equipment of claim 1, wherein the instructions, when executed by the at least one processor, cause the user equipment at least to:
transmit at least one indication of the at least one set of additional configurations after performing the at least one first measurement.

14. A method, comprising:
receiving, by a user equipment, a configuration message including at least one first configuration and one or more sets of additional configurations, wherein the at least one first configuration comprises information that identifies at least one first set of time frequency resources for at least one reference signal (RS), and the one or more sets of additional configurations identifies time frequency resources for at least one set of positioning reference signals (PRSs);
performing, by the user equipment, at least one first measurement of at least one reference signal for beam measurements according to the at least one first configuration, wherein the at least one reference signal comprises at least one wide-beam reference signal;
wherein the at least one first configuration is associated with one or more sets of additional configurations for beam measurements;
wherein the at least one set of positioning reference signals comprises at least one narrow-beam positioning reference signal;
performing, by the user equipment, based on the at least one first measurement at least one second measurement of at least one set of positioning reference signals according to at least one set of additional configurations of the one or more sets of additional configurations; and
transmitting, by the user equipment, at least one angle of departure (AoD) measurement report after performing the at least one second measurement.

15. The method of claim 14, wherein a beam coverage of the at least one narrow-beam positioning reference signal is within a beam coverage of one wide-beam reference signal.

16. A non-transitory computer readable storage medium storing executable code that, when executed by a user equipment, cause the user equipment to:
receive a configuration message including at least one first configuration and one or more sets of additional configurations, wherein the at least one first configuration comprises information that identifies at least one first set of time frequency resources for at least one reference signal (RS), and the one or more sets of additional configurations identifies time frequency resources for at least one set of positioning reference signals (PRSs);
perform at least one first measurement of at least one reference signal for beam measurements according to the at least one first configuration, wherein the at least one reference signal comprises at least one wide-beam reference signal;
wherein the at least one first configuration is associated with one or more sets of additional configurations for beam measurements;
wherein the at least one set of positioning reference signals comprises at least one narrow-beam positioning reference signal;
perform based on the at least one first measurement at least one second measurement of at least one set of positioning reference signals according to at least one set of additional configurations of the one or more sets of additional configurations; and
transmit at least one angle of departure (AoD) measurement report after performing the at least one second measurement.

* * * * *